May 10, 1932. E. WALDER 1,857,900
THERMOSTATIC ELECTRICAL PLUG
Original Filed March 7, 1927
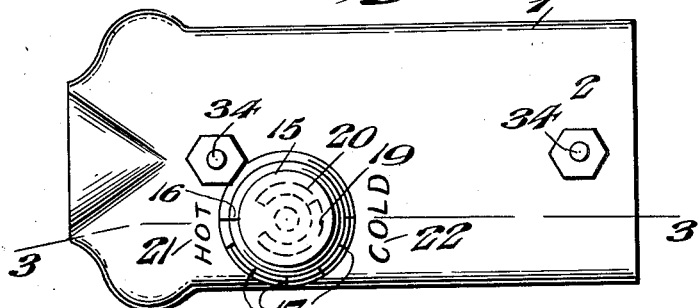
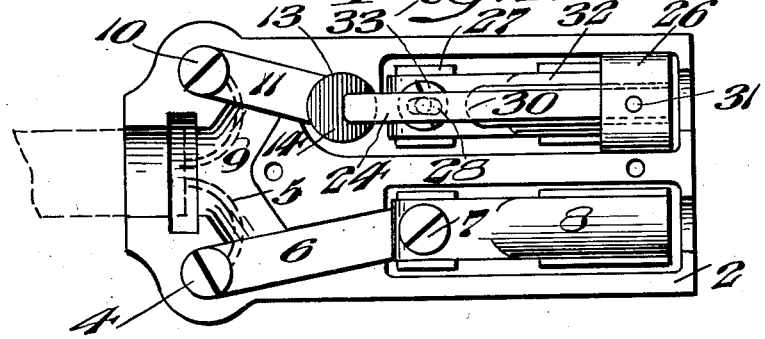
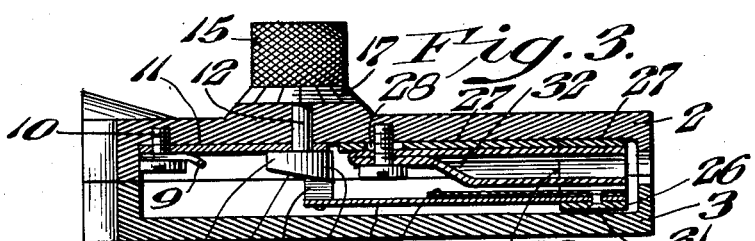
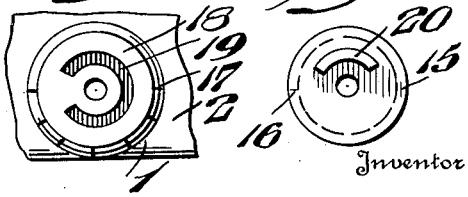
Inventor
Emil Walder
By Herbert S. Fairbanks
Attorney Patented May 10, 1932

1,857,900

UNITED STATES PATENT OFFICE

EMIL WALDER, OF PHILADELPHIA, PENNSYLVANIA, ASSIGNOR TO THE BEARDSLEY & WOLCOTT MANUFACTURING COMPANY, A CORPORATION OF CONNECTICUT

THERMOSTATIC ELECTRICAL PLUG

Application filed March 7, 1927, Serial No. 173,437. Renewed December 5, 1929.

The object of this invention is to devise a novel construction and arrangement of a thermostatic electrical plug which is adapted to be connected with an electrical appliance, the construction being such that when the temperature of the electrical appliance rises above the set standard of temperature for which the plug has been set, the electrical circuit will be automatically opened, and when the temperature of the electrical appliance falls below a predetermined set standard for which the plug has been adjusted, the electrical circuit is automatically closed, thereby enabling one to automatically maintain the electrical appliance at a substantially constant temperature.

A further object of this invention is to devise a novel thermostatic circuit breaker or an automatic electrical switch wherein the thermostatic element cooperates with a movable contact to move it in one direction, the movable contact being carried by a spring which tends to move it in the opposite direction, and said movable contact is adapted to cooperate with a cam face which can manually be adjusted by means of a handle exterior of the casing or shell of the plug to determine the degree of temperature at which the electrical circuit will be opened and closed.

With the above and other objects in view as will hereinafter more clearly appear, my invention comprehends a novel construction and arrangement of an automatic electrical plug which embodies a novel construction and arrangement of a thermostatic switch, automatically controlling the opening and closing of the electrical circuit.

It further comprehends a novel construction and arrangement of an automatic electrical plug wherein a thermostatic element effects the movement of a movable contact in one direction and the spring effects the movement of the movable contact in the opposite direction, said movable contact being adapted to cooperate with a manually adjustable eccentric or cam member, having a cam formed at its end.

It further comprehends a novel construction and arrangement of a thermostatic switch wherein the thermostatic element is fixed at one end to a conducting member which is in electrical connection with a pilot terminal.

Other novel features of construction and advantage will hereinafter more clearly appear in the detailed description and appended claims.

For the purpose of illustrating the invention, I have shown in the accompanying drawings a typical embodiment of it, which, in practice, will give satisfactory and reliable results. It is however, to be understood that the various instrumentalities of which my invention consist can be variously arranged and organized and my invention is not limited to the exact arrangement and organization of these instrumentalities, as herein set forth.

Figure 1 is a top plan view of a thermostatic electrical plug embodying my invention.

Figure 2 is a top plan view with one section or casing of the shell removed.

Figure 3 is a section on line 3—3 of Figure 1.

Figure 4 is a top plan view of a conducting member, the thermostatic element, and the movable contact showing more particularly the manner in which the parts are secured together.

Figure 5 is an end view of Figure 4.

Figure 6 is a top plan view of a portion of the shell.

Figure 7 is a bottom plan view of the handle.

Similar numerals of reference indicate corresponding parts.

Referring to the drawings:—

1 designates a thermostatic plug embodying my invention which is provided with casing sections 2 and 3 which are insulated from the elements contributing to form the electrical circuit or are preferably made of insulating material.

The elements which contribute to form the portion of the electrical circuit which is contained within the plug are seated or secured in recesses in the inner faces of the casing sections, it being understood that the character of such recessed portions will vary according to the size and contour of the conducting elements which contribute to form the thermostatic switch mechanism which automatically effects the opening and closing of the electrical circuit.

The casing section 2 has fixed in it the binding post 4 to which the conductor 5 is connected. The binding post 4 secures in position in the shell a conducting strip 6 which is connected by means of a fastening device 7 to a terminal 8 which is usually in the form of a socket in order to adapt it to receive the prong of an electrical appliance to which it is intended to be attached.

The fastening device 7 preferably is in threaded engagement with the shell or with a nut, not shown, which is set into the material of the casing section 2. The other conductor 9 is electrically connected with the binding post 10, which also secures, with respect to the casing section 2, a conducting member 11 through which passes the rod 12 which is in electrical connection with the conducting member 11.

The rod 12 has fixed to its inner end a cam member 13 having its end face forming a cam 14. This cam 14 forms the fixed contact and is set in its adjusted position by means of a grasping handle 15, fixed to the rod 12. The handle 15 has a base flange provided with a graduation 16 which is adapted to be brought into alignment with the graduation 17.

On the outer face of the casing section 2 and in proximity to the raised flattened portion 18, this flattened portion 18 is provided with a curved recess 19 into which is adapted to extend the curved lug 20 extending from the bottom of the handle 15 so that the extent of relative rotation of the handle 15, and thereby of the cam 14, is limited. The outer face of the casing section 2, has preferably indicated thereon the word "hot", as shown at 21, and the word "cold", as shown at 22.

The movable contact 23 is secured in any desired manner to the free end of spring 24, and this movable contact 23 has an inclined contact face, as at 25, which conforms to the inclination of the cam 14. The inclined contact face of the movable contact 23 provides a contact face of greater area than if it were straight as otherwise a line contact would be produced. The spring 24 has its forward end fixed to the outer bridge member 26 of a conducting member 27, which latter is in the form of a flat strip of material having an enlarged head at one end provided with an elongated opening 28 and having at its opposite end a box shaped contour including the upwardly projecting sides or flanges 29 which merge into the upper bridge piece 26. This bridge piece 26 also has connected with it, inwardly of the spring 24, one end of a bi-metallic element 30. As illustrated, a rivet 31, see Figure 3, serves to secure both the fixed end of the spring and the fixed end of the thermostatic element 30 to the bridge piece 26 of the conducting member 27.

The pilot terminal 32 is in the form of a socket which is secured to the casing section 2 by means of a fastening device 33, which also passes through the opening 28 in the conducting member 27 so that a single fastening device serves to fix in position the conducting member 27 and its adjuncts and the pilot terminal 32.

The fastening device 33 may be in the form of a screw in threaded engagement with the material of the casing section 2, or with a screw set into such material. The casing sections are secured together in any desired manner by means of a fastening device 34.

The operation of my novel thermostatically controlled electrical plug will now be apparent to those skilled in this art and is as follows.

When the handle 15 is turned to bring the lower part of the cam 14 into contact with the movable contact 23, as shown in Figure 3, current flow is established from the line through the device to which the plug is attached, whereas, when the cam is moved out of contact with the contact 23, circuit is broken and current will not pass to the electrical appliance to which the plug is attached.

It will thus be understood that the cam 13 can be adjusted by means of the handle 15 exterior of the casing to a desired or predetermined position which will be visibly indicated exterior of the casing and which will be indicative of a set or predetermined standard of temperature at which the electrical circuit will be automatically opened and closed.

The bi-metallic thermostatic element 30 is closely associated with the pilot terminal 32, and as illustrated, the conducting member 27 to which the thermostatic element is connected, is in direct and electrical contact with the pilot terminal 32 which derives its heat directly from the electrical appliance to which the plug is attached.

If the electrical appliance to which the plug is attached rises above the temperature for which the thermostatic switch has been adjusted, then the free end of the bi-metallic thermostatic end 30 will be deflected outwardly, thereby causing the spring 24 to move outwardly and move the movable contact 23 out of contact with the cam face 14 of the cam 13, which latter forms the adjustable fixed contact.

If the temperature of the electrical appliance to which the plug is attached falls below the set standard of temperature for which the cam 13 has been adjusted, then the bi-metallic thermostatic element 30 will cool sufficiently to permit the spring 24 to return the movable contact 23 into contact with the cam 13 thereby automatically closing the electrical circuit.

It will thus be clear that in accordance with my present invention I have devised a novel and simplified construction of a thermostatic switch which can be contained within and carried by one section of the casing of an electrical plug, and wherein a manually adjustable contact is employed which is adapted to cooperate with the movable contact which latter is moved in one direction by a spring, and in its opposite direction by means of a bi-metallic thermostatic element which derives its heat directly from the pilot terminal of the plug, so that the thermostatic element, while being contained in and carried by the plug, is connected as closely as is practical to the prong of the electrical appliance to which it is attached.

In a co-pending application Serial No. 2,160, filed January 13, 1925, I have described and broadly claimed a thermostatic switch in which the bi-metallic thermostatic element is closely associated with the pilot terminal.

In my co-pending application Serial No. 144,445, filed October 27, 1926, I have described and broadly claimed a thermostatic switch construction wherein the bi-metallic thermostatic element effects the movement of a movable contact in both directions, relatively to an eccentric or cam, while in my present invention the movable contact is controlled in its movement in both directions by the thermostatic element, and as illustrated, the thermostatic element acting against the spring effects the opening of the electrical circuit and also on a decrease in temperature of the electrical appliance to which the plug is attached permits the spring to return the movable contact into a position to effect the closing of the electrical circuit.

The relative position of the movable contact 23, with respect to the cam face 14, can be varied due to the provision of the slot 28 which permits the pilot terminal 32, as well as the conducting member 27 and its adjuncts to be longitudinally adjusted within the casing section.

It will now be apparent that I have devised a new and useful thermostatic electrical plug which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention what I claim as new and wish to secure by Letters Patent, is:—

1. In a thermostatic switch plug, a terminal socket therein, a thermostatic member responsive to temperature changes of said socket, a spring movable independently of said member and electrically connected to said socket and said spring being flexed by the movement of said thermostatic member, a contact, and a cooperating contact carried by said spring and engageable with said contact.

2. In a thermostatic switch plug, a terminal socket therein, a thermostatic member responsive to temperature changes of said socket, a spring movable independently of said member and electrically connected to said socket, said spring being flexed by the movement of said thermostatic member, a manually adjustable cam contact, and a co-operating contact carried by said spring and engageable with said cam contact.

3. In a thermostatic switch plug, a terminal socket therein, a thermostatic member having one end connected in heat conducting relation thereto, a spring electrically connected to said socket adjacent said end and extending beyond the opposite end of said member and engageable between its ends by said member, a contact carried by the protruding end of said spring, and a co-operating contact engagable by said contact.

4. In a thermostatic switch plug, a terminal socket therein, a thermostatic member having one end connected in heat conducting relation thereto, a spring electrically connected to said socket and member by the same connection therebetween and extending beyond the opposite end of said member and engageable between its ends by said member, a contact carried by the protruding end of said spring, and a co-operating contact engageable by said contact.

5. In a thermostatic switch plug, a terminal socket therein, a thermostatic member extending longitudinally thereof and having one end connected in heat conducting relation thereto, a spring extending substantially throughout the length of said member and beyond the free end thereof, having its opposite end connected to said member, a contact carried by the protruding end of said spring, and a co-operating contact engageable by said contact.

6. In a thermostatic switch plug, a terminal socket therein having a projection connected thereto and disposed adjacent to the front end thereof, a bi-metallic member carried by said projection and extending longitudinally of said socket, a spring likewise carried by said projection and extending longitudinally of said bi-metallic member and beyond the free end thereof, a contact carried by the free end of said spring, and a co-operating contact engageable by said contact.

7. In a thermostatic switch plug, a terminal socket therein, an underlying member electrically connected thereto and having a projection disposed adjacent to the front end thereof, a bi-metallic member carried by said projection and extending rearwardly longitudinally of said socket, a spring likewise carried by said projection and extending longitudinally of said bi-metallic member and beyond the free end thereof, said spring being movable toward or away from said bi-metallic member substantially throughout the length of the latter, a contact carried by the free end of said spring, and a co-operating contact engageable with said contact and disposed at the opposite end of said socket member.

8. In a thermostatic switch plug, a terminal socket therein, a thermostatic member connected in heat conducting relation with one end of said socket and extending rearwardly longitudinally thereof, a spring member extending longitudinally of said thermostatic member and having a fixed end adjacent to the fixed end of the latter electrically connected to said socket and a free end protruding beyond the free end of said member, said spring being engaged and deflected between its ends by the free end of said thermostatic member upon heating of the latter, a contact carried on the free end of said spring, and a co-operating contact engageable with said contact.

9. A thermostatic switch for an electrical plug comprising a terminal therein, a conducting member electrically connected with said terminal and in heat conducting relation with the front end thereof, a manually adjustable cam forming a fixed contact, a movable contact, a thermostatic element in heat conducting relation with said conducting member at the front end of said terminal, and a spring tensioned and released by said thermostatic member having a free end extending beyond said thermostatic member and carrying said movable contact and electrically connected to said conducting member at the front end of said thermostatic member.

10. In a thermostatic switch plug, a terminal socket therein, a thermostatic member responsive to temperature changes of said socket and movable relative to the latter while extending longitudinally thereof, a contact electrically connected to said socket, controlled by said thermostatic member and movable independently thereof, and a second contact co-operating with said contact and disposed in the path thereof and adjustable relative thereto.

11. In a thermostatic switch plug, a terminal socket therein, a thermostatic member responsive to temperature changes of said socket and movable relative to the latter while extending longitudinally thereof, a contact electrically connected to said socket, controlled by said thermostatic member and movable independently thereof, a second contact co-operating with said contact and disposed in the path thereof and adjustable relative thereto, and indicating adjusting means for said adjustable second contact operable from the exterior of the plug.

12. A thermostatic switch for an electrical plug, comprising a terminal, a conducting member electrically connected with the forward end of said terminal, a manually adjustable cam forming a fixed contact, a movable contact, the cooperating faces of said contacts being inclined and engaging in one position with a large surface contact, a bi-metallic thermostatic element connected with said member and effective to move said movable contact in one direction, and a spring to move said movable contact in a reverse direction.

13. A thermostatic switch for an electrical plug, comprising a pilot terminal, a conducting member closely associated with and deriving heat from said terminal, a bi-metallic thermostatic element having one end fixed to said member and extending along said terminal, a movable contact moved in one direction by said thermostatic element, a spring to move said movable contact in an opposite direction, and a manually adjustable cam having its end face forming a fixed contact which cooperates with said movable contact to automatically open and close the electrical circuit.

14. A thermostatic switch for an electrical plug, comprising a conducting member in the form of a strip having a box shaped contour at its forward end, a terminal extending along side of said member and electrically connected with it, a bi-metallic thermostatic strip fixed at one end to said member, a spring actuated movable contact movable in one direction by its spring and in the opposite direction by said thermostatic element, and a manually adjustable cam cooperating with said movable contact to automatically open and close the electrical circuit.

15. A thermostatic switch for an electrical plug, comprising a conducting member in the form of a strip having a box shaped contour at its forward end, a terminal extending along side of said member and electrically connected with it, a bi-metallic thermostatic strip fixed at one end to said member, a spring actuated movable contact movable in one direction by its spring and in the opposite direction by said thermostatic element, and a manually adjustable cam, said cam having its end face forming an inclined cam face, and said movable contact having a correspondingly inclined contact face, and said cam and movable contact cooperating to automatically open and close the electrical circuit.

16. A thermostatically controlled switch for an electrical plug, comprising a conducting member, a terminal socket secured in electrical contact with said member, a bimetallic thermostatic element having one end fixed to said member and extending rearwardly along said socket, a spring having one end fixed to said member and extending along said thermostatic element to be moved thereby in one direction and permitted thereby to move in an opposite direction when the temperature of said element varies a predetermined degree, a contact carried by said spring, and a manually adjustable cam having its end forming a cam face cooperating with said spring carried contact to automatically effect the opening and the closing of the electrical circuit on predetermined variations in temperature of the heating appliance to which the plug is attached.

EMIL WALDER.